(No Model.)
E. P. LYNCH.
CARRIAGE WHEEL.
No. 294,056. Patented Feb. 26, 1884.
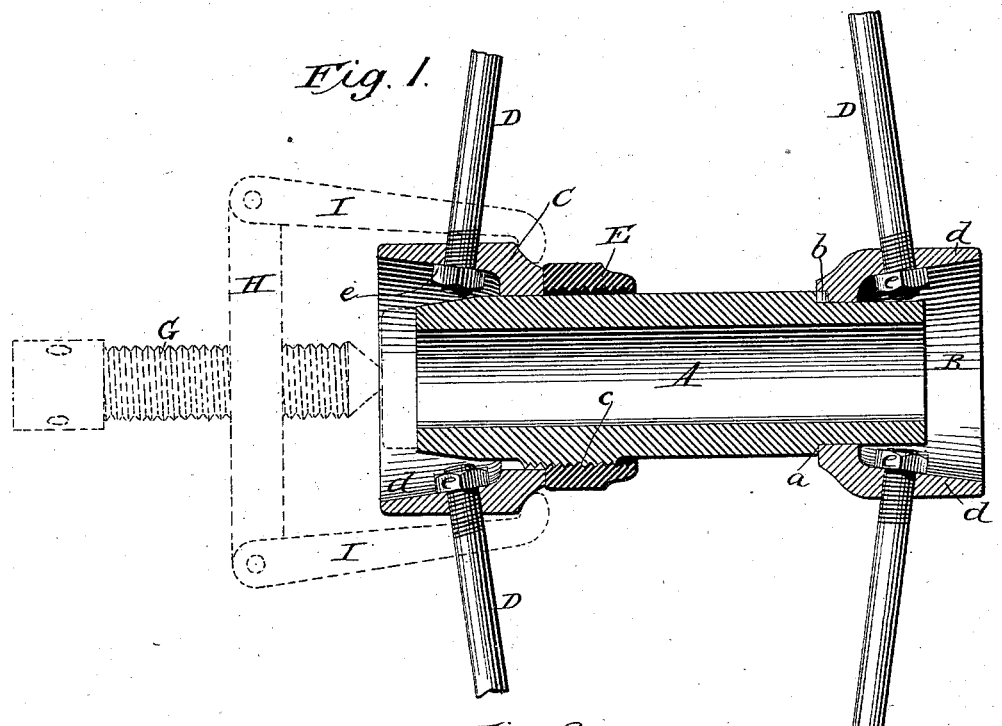
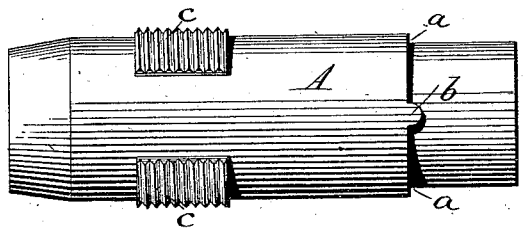
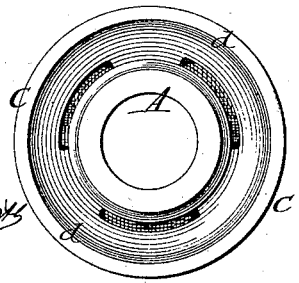
Attest:
Sidney P. Hollingsworth
Newton Wyckoff.
Inventor:
E. P. Lynch
By his attorney
Philip T. Dodge.

United States Patent Office.

EDWARD P. LYNCH, OF DAVENPORT, IOWA.

CARRIAGE-WHEEL.

SPECIFICATION forming part of Letters Patent No. 294,056, dated February 26, 1884.

Application filed November 10, 1883. (No model.)

*To all whom it may concern:*

Be it known that I, EDWARD P. LYNCH, of Davenport, in the county of Scott and State of Iowa, have invented certain Improvements in Carriage-Wheels, of which the following is a specification.

My invention relates to improvements in what are commonly known in the art as "suspension-wheels," wherein the hub is carried by means of metallic spokes connecting the same with the rim and maintained under a proper tension.

The invention relates to the peculiar construction and arrangement of a box or pipe with collars adapted to receive the inner ends of the spokes, and devices securing said collars upon the central pipe.

Referring to the accompanying drawings, Figure 1 represents a central cross-section through a hub or wheel constructed on my plan. Fig. 2 is a side view of the central pipe or box. Fig. 3 is a view looking against the threaded end of the box and the collar thereon.

In proceeding to construct my wheel I first provide a tubular axle-box, A, of the form shown in Figs. 1 and 2. At one end this box is formed with a circumferential shoulder, $a$, having a laterally-projecting lip, $b$, at one or more points in its length, as represented in Fig 2. At the opposite end the box is provided with a screw-thread, $c$, the box projecting slightly beyond the threaded portion. As shown in the drawings, this screw-thread is divided transversely into sections or lengths, each of which but partially encircles the box, so that intermediate smooth or unthreaded portions are formed, for a purpose which will be presently explained. Upon and around this threaded portion of the box I mount a nut, E, as shown. I next provide two flanges or collars, B and C, adapted to fit upon the respective ends of the box. Each collar is provided with an outwardly-extending flange, $d$, provided with perforations to receive the inner ends of the spokes D, which are inserted through the same and secured by the application of nuts $e$ to their inner ends or otherwise. It will be observed that the collars are constructed in such manner as to leave a space to receive the nuts between the interior of the collar and the exterior of the box or sleeve.

The collar B is provided with a cavity or recess to receive the projection $b$ on the box, whereby it is prevented from rotation thereon. The collar C is constructed to closely encircle the threaded portion of the box with inwardly-projecting portions, which bear upon the box between the ends of the threaded sections, against which they abut in such manner as to prevent the rotation of the collar upon the box.

In assembling the parts the spokes are connected at their outer ends to a metallic or other rim or felly in any suitable manner, and their inner ends secured to their respective collars, as represented in the drawings. The collars being applied to the ends of the box and prevented from rotation by means before described, the nut E is turned outward against the collar C, forcing the same toward the end of the box away from its companion, thereby separating the inner ends of the spokes and causing the same to be strained longitudinally. The construction of the collars with the flange extended in an outward direction, as shown, admits of access being had to the nuts upon the inner ends of the spokes, thus facilitating the operation of adjusting or replacing them.

It will be found convenient in assembling the parts to employ a device such as represented in dotted lines in Fig. 1, for the purpose of drawing the movable collar forward against the resistance offered by the spokes a sufficient distance to permit the application of the nut to the threads. This device consists simply of a central screw, G, passing through a plate, H, provided with hooked arms I. The screw G will be seated against a plate on the end of the box and the arms I engaged with the collar, after which, by turning the screw, the plate H and its arms will be caused to draw the collar outward.

Having thus described my invention, what I claim is—

1. In a suspension-wheel, the tubular box having one end threaded externally and the opposite end reduced in diameter and provided with a lip, the non-rotating collar applied over one end of the box, the sliding non-rotating collar applied over the other end of the box, and the nut E, applied to the box and acting to urge the collar C outward, whereby the parts are adapted to apply a tensile strain to the spokes.

2. The tubular box A, provided with the shoulder *a* and mutilated screw-thread, combined with the spokes, the stationary collar B, the movable non-rotating collar C, and the nut acting against said collar.

3. In a carriage-wheel, the combination of a tubular box with mutilated threads thereon, a sliding spoke-receiving collar mounted to slide upon said box, and secured against rotation by engagement with the ends of the threads, and a nut mounted upon said threads and acting against said collar, substantially as described.

4. In a suspension-wheel, the tubular box, the two non-rotating collars applied to the ends of the box, and constructed, as described, to afford an open space between their inner surfaces and the outer surface of the box, the nut applied to urge the collar C outward, and the spokes inserted through the collars from the exterior, and provided with retaining nuts or heads upon their inner ends, as described, whereby the entire series of spokes may be adjusted simultaneously, or the individual spokes removed and replaced or varied in tension without removing or adjusting the other parts.

5. In a suspension-wheel, the combination of the following elements: a rim or felly, a central box, two spoke-receiving collars, one of which is fixed and the other movable upon the box, and means, substantially as described, for effecting the adjustment of the movable collar lengthwise of the box.

EDWARD P. LYNCH.

Witnesses:
W. J. BIRCHARD,
JAMES GLASSEY.